US010057109B2

(12) United States Patent
Shatzkamer et al.

(10) Patent No.: US 10,057,109 B2
(45) Date of Patent: Aug. 21, 2018

(54) DEFINING INTERDEPENDENT VIRTUALIZED NETWORK FUNCTIONS FOR SERVICE LEVEL ORCHESTRATION

(71) Applicant: Cisco Technology, Inc., San Jose, CA (US)

(72) Inventors: Kevin Shatzkamer, Hingham, MA (US); David Lake, Santa Clara, CA (US); Aeneas Sean Dodd-Noble, Andover, MA (US); Peter Bosch, Aalsmeer (NL)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 14/246,992

(22) Filed: Apr. 7, 2014

(65) Prior Publication Data

US 2014/0317261 A1     Oct. 23, 2014

Related U.S. Application Data

(60) Provisional application No. 61/814,685, filed on Apr. 22, 2013.

(51) Int. Cl.
*H04L 12/24*     (2006.01)
*G06F 9/455*     (2018.01)

(52) U.S. Cl.
CPC .............. *H04L 41/04* (2013.01); *G06F 9/455* (2013.01); *G06F 9/45558* (2013.01);

(Continued)

(58) Field of Classification Search
None
See application file for complete search history.

(56) References Cited

U.S. PATENT DOCUMENTS

| 7,197,553 | B2 * | 3/2007 | Roberts | .................. H04L 41/12 |
| | | | | 709/218 |
| 7,200,704 | B2 * | 4/2007 | Njoku | ................. G06F 13/4022 |
| | | | | 709/238 |

(Continued)

OTHER PUBLICATIONS

Alcatel-Lucent, "Contribution to NFV Management and Orchestration", XP014152803, Feb. 19, 2013, NFVMan: NFV Management and Orchestration—Objectives Section, European Telecommunications Standards Institute (ETSI), ETSI Draft, 5 pages.

(Continued)

*Primary Examiner* — Patrice L Winder
(74) *Attorney, Agent, or Firm* — Leon R. Turkevich

(57) ABSTRACT

In one embodiment, a method comprises identifying, by an orchestrator executed by a physical machine, a plurality of virtualized network functions required for implementation of a virtualized network service for a customer, each virtualized network function having a corresponding and distinct virtualized container specifying attributes for defining execution of the corresponding virtualized network function within one or more physical machines; and setting by the orchestrator an interdependency indicator within each virtualized container based on association with the virtualized network service, enabling identification of each of the virtualized network functions as interdependent for coordinated execution of the virtualized network service.

20 Claims, 8 Drawing Sheets

(52) U.S. Cl.
CPC ............... *H04L 41/5054* (2013.01); *G06F 2009/45595* (2013.01); *H04L 41/5096* (2013.01)

(56) References Cited

U.S. PATENT DOCUMENTS

| | | | | |
|---|---|---|---|---|
| 7,246,178 B2* | 7/2007 | Roberts | H04L 41/0213 | 709/249 |
| 7,765,093 B2* | 7/2010 | Li | H04L 41/0843 | 703/13 |
| 8,374,183 B2* | 2/2013 | Alkhatib | H04L 45/02 | 370/392 |
| 8,453,144 B1* | 5/2013 | Keagy | G06F 9/45558 | 718/1 |
| 8,543,998 B2* | 9/2013 | Barringer | G06F 11/3664 | 717/169 |
| 8,825,862 B2* | 9/2014 | Anderson | G06F 9/5072 | 709/226 |
| 8,856,889 B2* | 10/2014 | Alwar | G06F 9/5077 | 726/4 |
| 8,910,156 B1* | 12/2014 | Kenchammana-Hosekote | G06F 9/45558 | 718/1 |
| 9,003,406 B1* | 4/2015 | Hodge | H04L 67/10 | 717/176 |
| 9,164,808 B2* | 10/2015 | Parker | G06F 9/45558 | |
| 9,170,797 B2* | 10/2015 | Raman | G06F 8/61 | |
| 9,178,807 B1* | 11/2015 | Chua | H04L 45/02 | |
| 9,231,933 B1* | 1/2016 | Shenoy | H04L 63/0815 | |
| 9,270,596 B2* | 2/2016 | Parker | H04L 47/10 | |
| 9,350,481 B2* | 5/2016 | Wei | H04J 14/0257 | |
| 2007/0234295 A1 | 10/2007 | Dufour et al. | | |
| 2008/0019377 A1* | 1/2008 | Nordmark | H04L 45/00 | 370/395.53 |
| 2008/0151893 A1* | 6/2008 | Nordmark | H04L 45/00 | 370/392 |
| 2009/0249354 A1* | 10/2009 | Yamaguchi | G06F 9/485 | 718/106 |
| 2009/0276775 A1 | 11/2009 | Brown et al. | | |
| 2010/0057908 A1* | 3/2010 | Smith | H04L 67/1002 | 709/225 |
| 2011/0023029 A1* | 1/2011 | Diab | G06F 9/45558 | 718/1 |
| 2011/0032944 A1* | 2/2011 | Elzur | H04L 49/602 | 370/395.53 |
| 2011/0090910 A1* | 4/2011 | Tripathi | H04L 49/00 | 370/395.1 |
| 2011/0093251 A1* | 4/2011 | Belgaied | H04L 41/12 | 703/13 |
| 2011/0145278 A1* | 6/2011 | Maes | G06Q 10/06 | 707/769 |
| 2011/0170550 A1* | 7/2011 | Takashima | H04L 47/125 | 370/400 |
| 2012/0147894 A1 | 6/2012 | Mulligan et al. | | |
| 2012/0158938 A1* | 6/2012 | Shimonishi | H04L 41/0233 | 709/223 |
| 2012/0221700 A1* | 8/2012 | Dutta | H04L 41/0853 | 709/223 |
| 2012/0222004 A1* | 8/2012 | Labat | G06F 9/50 | 717/120 |
| 2012/0222037 A1* | 8/2012 | Labat | G06F 9/5072 | 718/104 |
| 2013/0219388 A1* | 8/2013 | Moeller | G06F 9/45558 | 718/1 |
| 2014/0059178 A1 | 2/2014 | Dutta et al. | | |
| 2014/0122743 A1* | 5/2014 | Di Benedetto | H04L 69/22 | 709/250 |
| 2014/0201374 A1* | 7/2014 | Ashwood-Smith | H04L 41/18 | 709/226 |
| 2014/0229945 A1* | 8/2014 | Barkai | H04L 49/70 | 718/1 |
| 2015/0244771 A1* | 8/2015 | Pasdar | H04L 67/10 | 709/217 |

OTHER PUBLICATIONS

Cisco White Paper, "Cisco Cloud Computing—Data Center Strategy, Architecture, and Solutions", [online]. 2009. [retrieved on Feb. 16, 2012]. Retrieved from the Internet: <URL: http://www.cisco.com/web/strategy/docs/gov/CiscoCloudComputing_WP.pdf>, pp. 1-16.

Wikipedia, "Cloud computing", [online]. Dec. 4, 2013. [retrieved on Dec. 4, 2013]. Retrieved from the Internet: <URL: http://en.wikipedia.org/wiki/Cloud_computing>, pp. 1-64.

LTE Acronyms—Iteencyclopedia, "LTE Acronyms", [online]. [retrieved on Jan. 18, 2014]. Retrieved from the Internet: <URL: https://sites.google.com/site/lteencyclopedia/lte-acronyms>, pp. 1-43.

Wikipedia, "Network Functions Virtualization", [online]. Dec. 2, 2013. [retrieved on Dec. 4, 2013]. Retrieved from the Internet: <URL: http://en.wikipedia.org/wiki/Network_Functions_Virtualization>, pp. 1-6.

Network Functions Virtualisation—Introductory White Paper, "Network Functions Virtualisation, an Introduction, Benefits, Enablers, Challenges & Call for Action", [online]. Oct. 22-24, 2012. [retrieved on Dec. 4, 2013]. Retrieved from the Internet: <URL: http://portal.etsi.org/NFV/NFV_White_Paper.pdf>, pp. 1-16.

Wikipedia, "Platform as a service", [online]. Nov. 13, 2013. [retrieved on Dec. 4, 2013]. Retrieved from the Internet: <URL: http://en.wikipedia.org/wiki/Platform_as_a_Service>, pp. 1-4.

* cited by examiner

DEFINING INTERDEPENDENT VIRTUALIZED NETWORK FUNCTIONS FOR SERVICE LEVEL ORCHESTRATION

This application claims priority to Provisional Application No. 61/814,685, filed Apr. 22, 2013.

TECHNICAL FIELD

The present disclosure generally relates to physical machine-based systems, referred to as orchestrator systems, for managing interconnections and interactions between virtualized computing networks. In particular, the present disclosure relates to virtualization of network functions.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Virtualization has extended from a single application service (e.g., a virtualized operating system) to virtualization of network functions. As more network functions are virtualized and support elastic scale, the ability to perform commissioning, capacity planning, and management of devices grows increasingly complex. When a network operator dimensions infrastructure, the manual process includes the understanding of interdependency between multiple software elements.

Network Function Virtualization (NFV) is now an Industry Standards Group (ISG) within the European Telecommunications Standards Institute (ETSI). Virtualization of network functions aims to define an architectural standard for replacing hardware appliances with virtual appliance by evolving standard IT virtualization technology, to enable consolidation of many network equipment types onto industry standard high volume servers, switches and storage. It involves implementing network functions in software that can run on a range of industry standard server hardware, and that can be moved to, or instantiated in, various locations in the network as required, without the need to install new equipment. This technology could provide significant benefits for network operators and their customers: reduced operator capital expenditures and operating expenditures through reduced equipment costs and reduced power consumption; reduced time-to-market to deploy new network services; improved return on investment from new services; greater flexibility to scale up, scale down or evolve services; openness to the virtual appliance market and pure software entrants; and opportunities to trial and deploy new innovative services at lower risk. As more vendors develop virtualized network functions (VNFs), significant modifications in how network operators provision the virtual environment and install new VNFs will take form.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
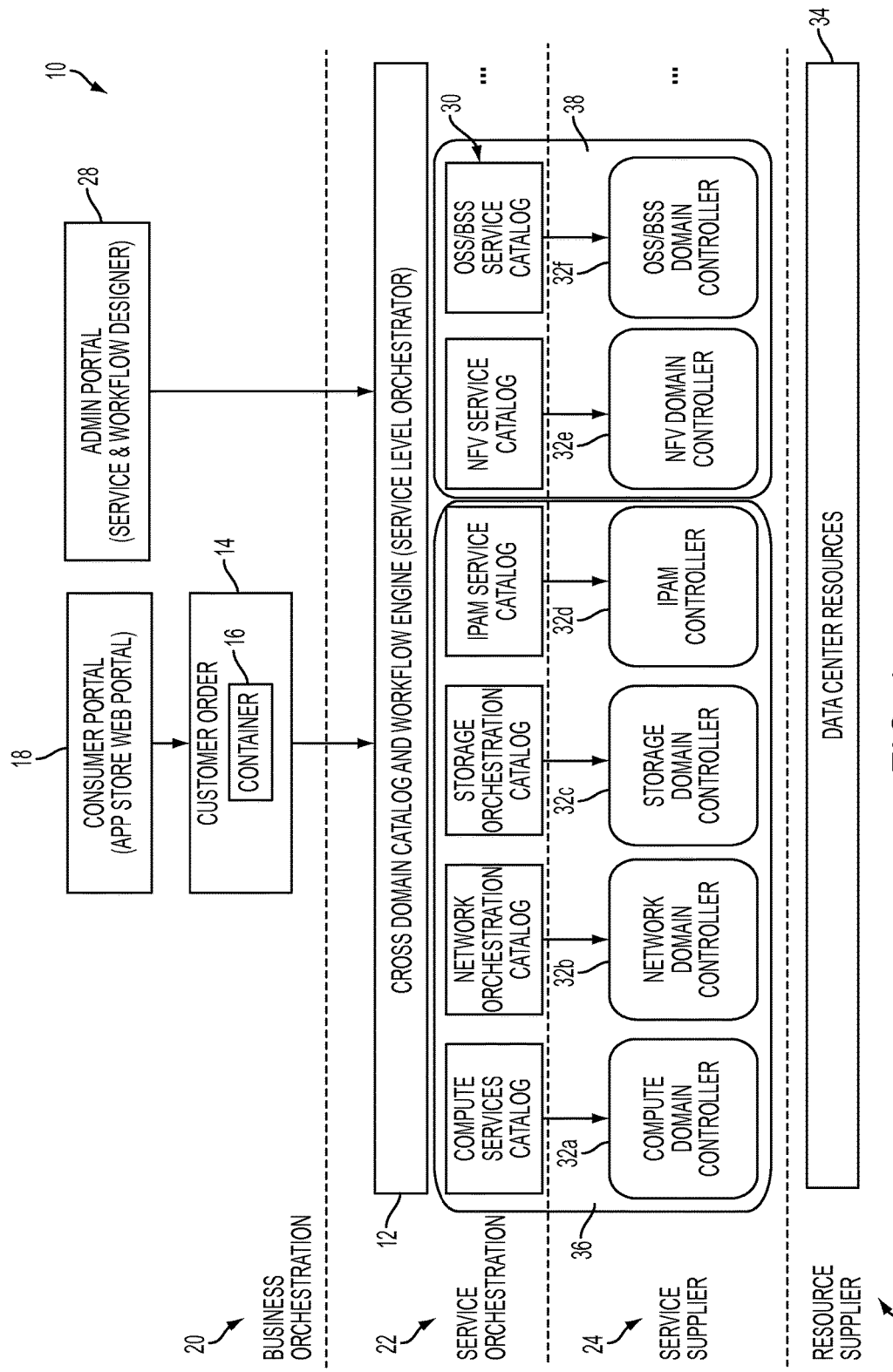
FIG. 1 illustrates an example architecture for coordinated execution of virtualized network services by an orchestrator executed by a physical machine and providing service level orchestration, according to an example embodiment.

In one embodiment, a method comprises identifying, by an orchestrator executed by a physical machine, a plurality of virtualized network functions required for implementation of a virtualized network service for a customer, each virtualized network function having a corresponding and distinct virtualized container specifying attributes for defining execution of the corresponding virtualized network function within one or more physical machines; and setting by the orchestrator an interdependency indicator within each virtualized container based on association with the virtualized network service, enabling identification of each of the virtualized network functions as interdependent for coordinated execution of the virtualized network service.

An additional aspect can be that the interdependency indicator can enable identification of an interdependency between at least a first attribute and a second attribute, where the first attribute is of a first virtualized network function of the virtualized network service and is of a first attribute type (e.g., network bandwidth), and the second attribute is of a second virtualized network function of the virtualized network service and is of a second attribute type (e.g. memory requirement) distinct from the first attribute type. Hence, the interdependency indicator can enable identification of interdependency between attributes of different virtualized network functions even if the interdependent attributes are of different distinct attribute types (e.g., compute, storage, memory, network).

In another embodiment, an apparatus is implemented as a physical machine, the apparatus comprising a non-transitory machine readable media configured for storing executable machine readable code, and a processor circuit. The processor circuit is configured for executing the machine readable code, and when executing the machine readable code operable for: identifying, by an orchestrator, a plurality of virtualized network functions required for implementation of a virtualized network service for a customer, each virtualized network function having a corresponding and distinct virtualized container specifying attributes for defining execution of the corresponding virtualized network function within one or more physical machines; and setting by the orchestrator an interdependency indicator within each virtualized container based on association with the virtualized network service, enabling identification of each of the virtualized network functions as interdependent for coordinated execution of the virtualized network service.

In another embodiment, logic encoded in one or more non-transitory tangible media for execution by a physical machine and when executed by the physical machine operable for: identifying, by an orchestrator executed by the physical machine, a plurality of virtualized network functions required for implementation of a virtualized network service for a customer, each virtualized network function having a corresponding and distinct virtualized container specifying attributes for defining execution of the corresponding virtualized network function within one or more physical machines; and setting by the orchestrator an interdependency indicator within each virtualized container based on association with the virtualized network service, enabling identification of each of the virtualized network functions as interdependent for coordinated execution of the virtualized network service.

DETAILED DESCRIPTION

Particular embodiments can identify within a virtual container the interdependence of specific software elements. In the example of Network Function Virtualization, being defined by the European Telecommunications Standards Institute (ETSI), the example embodiments can define interdependent Virtualized Network Functions and allow the management system to determine the appropriate interdependent scaling attributes between these virtualized network functions.

FIG. 1 illustrates an example architecture 10 for coordinated execution of virtualized network services by an orchestrator 12 executed by a physical machine (e.g., 14 FIG. 5) and providing service level orchestration, according to an example embodiment. The architecture 10 illustrates a service level orchestrator 12 providing a virtualized network service and including a business level orchestration layer 20, a service orchestration layer 22, a service supplier layer 24, and a resource supplier layer 26. As described in further detail below, the orchestrator 12 can identify virtualized network functions required for implementation of a virtualized network service requested by a customer (e.g., a customer request 14 in the form of a container 16) for example via a web-based consumer portal 18. The orchestrator 12 also can receive administrative and provisioning requests (e.g., adding physical resources 26 to inventory for allocating capacity, described below) from an administrative portal 28.

The service orchestration layer 22 can include the service level orchestrator 12 and catalogs 30 that track allocated capacity and available capacity for various virtualized services 32. Example virtualized services 32 can include a compute domain controller 32a for virtualized compute services, a network domain controller 32b for virtualized network services, a storage domain controller 32c for virtualized storage services, and IP address management (IPAM) 32d for virtualized IP address management services, for example personalized dynamic host configuration protocol (DHCP) services, a service gateway application domain controller 32e for virtualized Internet Protocol (IP) services (described in further detail below with respect to FIG. 7), a Operation Support System (OSS)/Business Support System (BSS) domain controller 32f for virtualized OSS/BSS services, etc. Execution of the virtualized services can be implemented by a resource supplier layer 26 providing physical resources 34, for example in a data center at a single location or distributed among different geographic locations and interconnected via a public or private local and/or wide area data network (e.g., the Internet).

The orchestrator 12 can create, for each catalog 30 and associated controller 32, a corresponding container that defines the associated operations to be performed, described below. The orchestrator 12 can set interdependency indicators within each of the containers, enabling for coordinated monitoring and management of each of the virtualized functions provided by the various controllers 32. In particular, controllers 32a, 32b, 32c, and 32d can be part of a virtualized Infrastructure as a Service (IaaS) 36, and the controllers 32e and 32f can be part of a virtualized Platform as a Service (PaaS) 38. As described in further detail below, the interdependency indicators enable virtualized network function to operate as a "stateful" entity that enables coordinated execution, monitoring, and scalability management among the virtualized containers associated with a network service.

Figure 2:
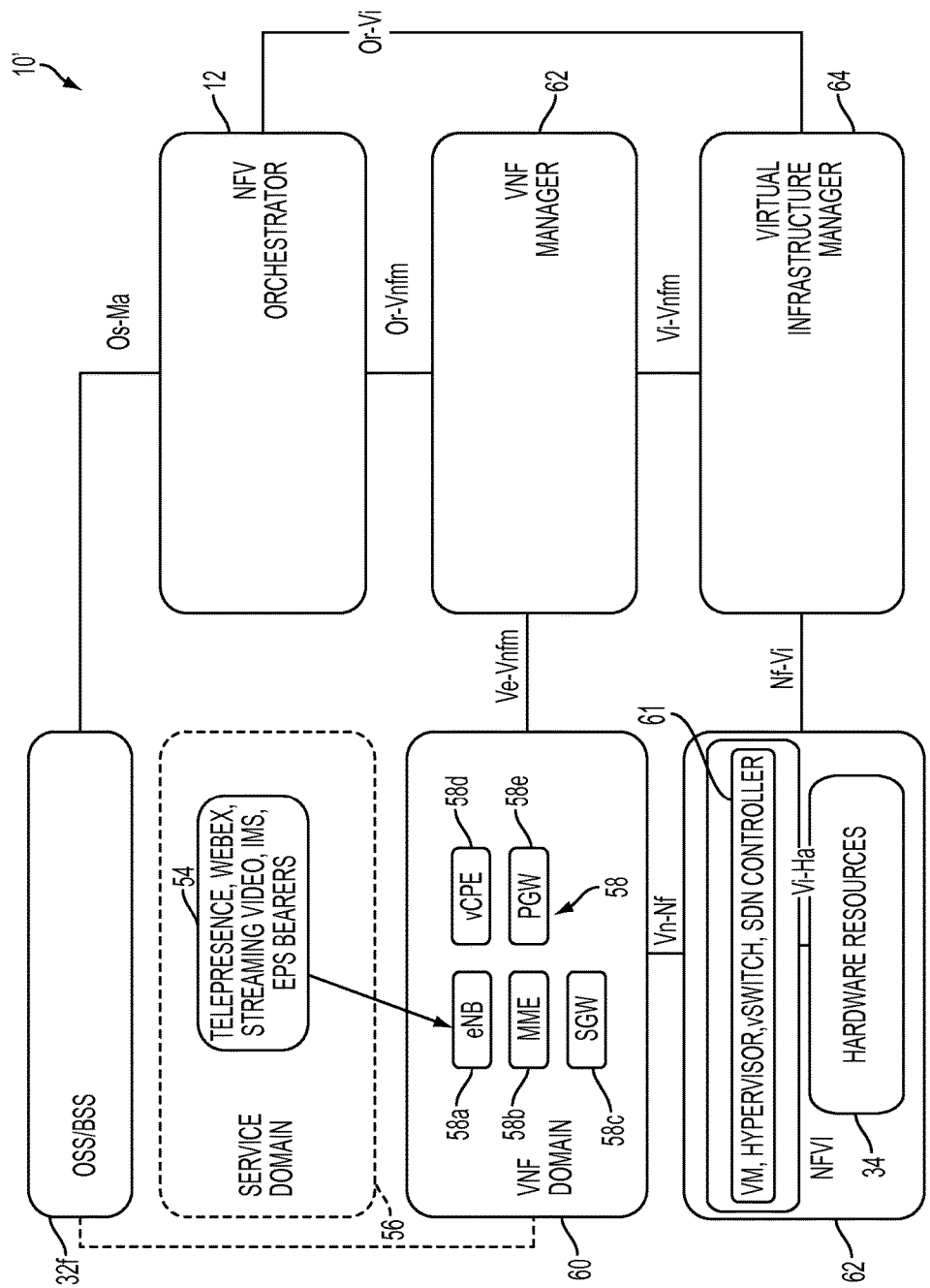
FIG. 2 illustrates another example architecture of the orchestrator of FIG. 1 providing coordinated execution of the virtualized network services based on execution of interdependent virtualized network functions according to an example embodiment.

FIG. 2 illustrates another example architecture 10' of the orchestrator 12 of FIG. 1 providing coordinated execution of the virtualized network services based on execution of interdependent virtualized network functions according to an example embodiment. FIG. 2 illustrates a virtualized OSS/BSS domain controller 32f in communication with a service level orchestrator 12 for provisioning of virtualized network services 54 from within a service domain 56, also referred to as a service level container.

Figure 3:
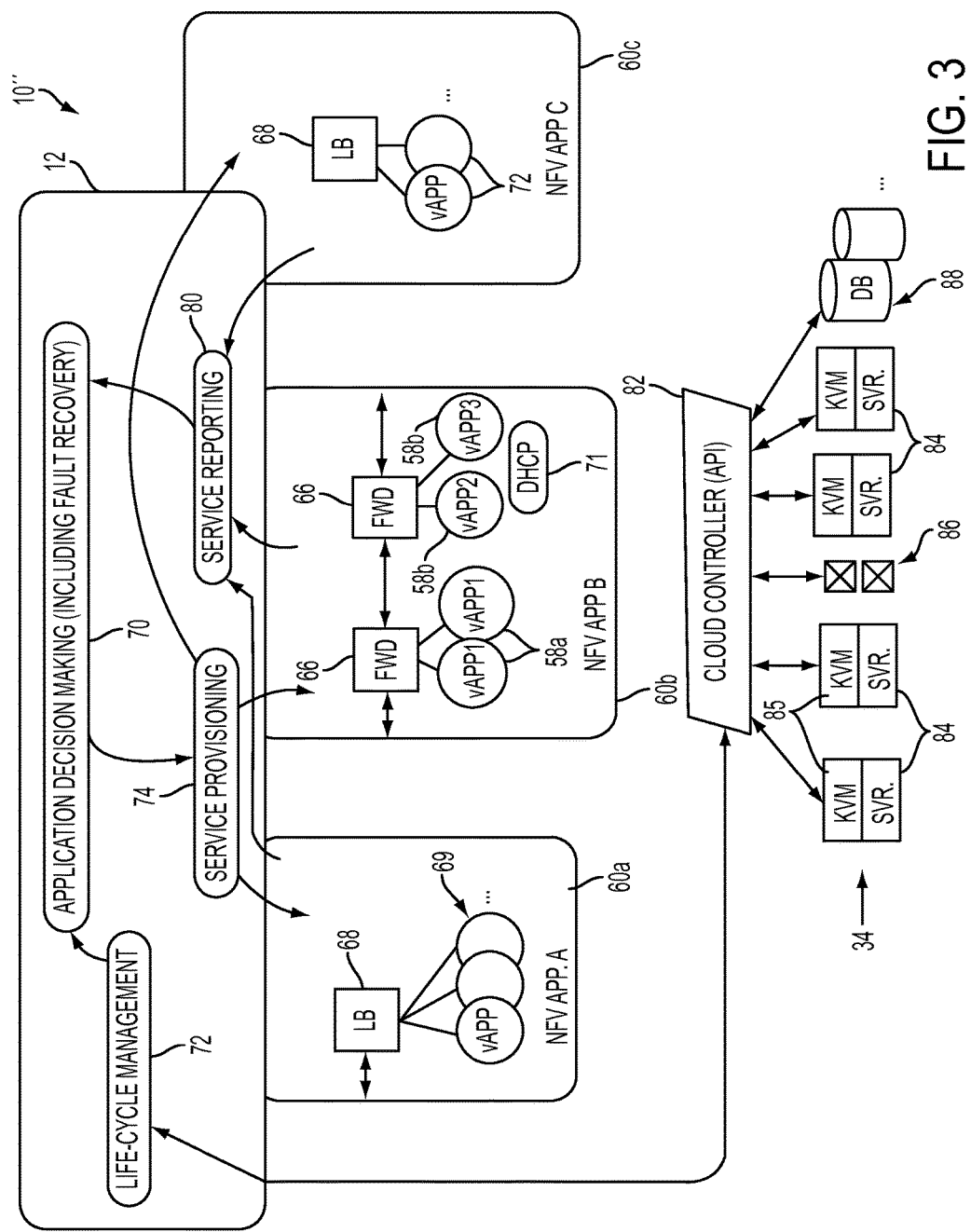
FIG. 3 illustrates another example architecture of the orchestrator of FIG. 1 providing coordinated execution of virtualized network functions across respective network function virtualization domains.

FIG. 3 illustrates a virtualized orchestrator 12 containing application decision-making logic (including fault recovery) 70, a life-cycle management controller 72, a service provisioning module 74, and a service reporting module 80 in another example architecture 10". The life cycle management module 72 can communicate with a cloud controller API 82 controlling virtualized infrastructure services 62 provided by hardware resources 34, e.g., a physical server machine 84 hosting a kernel-based virtual machine (KVM) 85, network switching devices 86, database storage devices 88, etc. Example operations by the life-cycle management module 72 can include starting virtual machines with image/boot parameters, suspend or kill virtual machines, detect hardware-based heartbeats, receiving hardware load parameters (e.g., CPU utilization, memory utilization, network link utilization, etc.).

The service reporting module 80 of FIG. 3 can receive context-based alerts or load parameters from the virtualized network functions 60a, 60b, and/or 60c. For example, the network function virtualization (NFV) 60a can provide classifier operations for a virtualized IP services using a virtualized load balancer 68 and virtualized classifier applications 69; the NFV 60b can provide software defined networking (SDN) service chains for the virtualized IP services, for example using virtualized forwarding switches 66, virtualized service applications (e.g., eNodeB) 58a and mobility management entity (MME) 58b, etc., and a virtualized dynamic host configuration protocol (DHCP) module 71; and the NFV 60c can provide application analytics for the virtualized IP services using a virtualized load balancer 68 and virtualized analytics applications 72. As described below, the service reporting module can receive updates from any one of the virtualized elements of the NFV applications 60 based on an interdependency indicator set in the corresponding container for the virtualized element.

The application decision making (and fault recovery) module 70 can provide overall provisioning requests to the service provisioning module 74 based on the information from the life cycle management module 72 regarding the virtualized hardware and/or hardware state as reported by the cloud controller API 72, new service requests from the OSS/BSS module 32 (not shown in FIG. 3), and/or the service reporting module 80 reporting on the state of the VNFs (e.g., 58, 66, 68, 69, 71, 72), for example on a per-service-chain basis based on the interdependency indicators.

The orchestrator 12 of FIGS. 1, 2, and 3 can track performance of each individual virtualized network function (VNF) 58, 62, 64, 66, within the VNF domain (i.e., VNF container) 60, based on receiving management messages, e.g., via a virtualized VNF manager (i.e., VNF manager container) 62; the orchestrator 12 can request the virtualized OSS/BSS domain controller 32f to execute a coordinated increase in capacity in the VNF domain 60 for each of the interdependent VNFs 58 associated with a given virtualized network service 54. Different types of virtualized network services 54 can be deployed according to the example embodiments, including virtualized network services having endpoints, and virtualized network services without endpoints (e.g., service brokers and/or translators). Example virtualized network services can include a Telepresence video conference session, a WebEx web meeting, streaming video, IP Multimedia System (IMS) session, an Evolved Packet System (EPS) Bearer session. For example, assume the orchestrator 12 in FIG. 2 initiates a new Evolved Packet System (EPS) service such as a mobile platform in a long term evolution (LTE) communications network: the orchestrator can allocate a virtualized Evolved Node B (eNodeB) 58a, a virtualized mobility management entity (MME) 58b, a virtualized Session Gateway (SGW) 58c, a virtual Customer Premises Equipment manager (CPE) 58d, and a virtualized packet gateway (PGW) 58e. As described in further detail below, the orchestrator 12 can set, within each container for the corresponding virtualized network function 58a, 58b, 58c, 58d, and 58e allocated for the specific virtualized EPS service 54, an interdependency indicator based on association with the virtualized EPS service 54. In other words, the interdependency indicator in each container can be used to establish interrelationships between the VNFs 58a, 58b, 58c, 58d, and 58e associated with a service chain, even though each VNF 58 normally would respond to requests only via the virtualized hardware elements (e.g., virtual machine, hypervisor, virtual switch, software defined network (SDN) controller) 61 in the network function virtualization instance (NFVI) 62. Hence, any virtualized VNF (e.g., 58b) can send an alert to a reporting module (80 of FIG. 3) indicating a need for more resources based on the interdependency indicator identifying to the virtualized VNF 58 (and/or any other resource polling the virtualized VNF 58) that it is interdependent with other VNFs, enabling the orchestrator 12 to request the OSS/BSS module 32f for a coordinated capacity increase for all the VNFs 58a, 58b, 58c, 58d, and 58e in the service chain, or any other VNF providing support for the service chain. The virtual infrastructure manager also can notify the orchestrator 12 of hardware-based capacity issues in either the virtual infrastructure elements 60 or physical hardware resource elements 34.

The identification between interdependent functions is based on setting an interdependency indicator within each container for a corresponding virtual network function associated with a virtual network service; in one embodiment, the interdependency indicator can be set in VNFs of a "service chain" (which can be implemented in the form of a serial chain topology, a star topology, or a bus topology) and any VNFs providing support for the service chain (e.g., billing interface, management, etc.). A "container" is defined as a definition of a particular executable function that can be executed, by a physical machine, as part of a virtualized service within a virtualized environment managed by a hypervisor, as opposed to a "bare metal" execution of the executable function directly by the physical machine. Examples of a physical machine can include a personal computer, a server computing element (e.g., "blade" server), a single or multiple processor core device implemented in a data center, etc. The "container" can have different forms, depending on the execution state of the corresponding executable function: if the execution state is inactive (e.g., shut down, suspended, hibernating, etc.), the container can be implemented solely as a data structure on one or more non-transitory physical media that includes any definitions, permanent and/or temporary application state variables, etc., that define the corresponding executable function at a prescribed application state; if the execution state is active, the container can be implemented as one or more executable instances of a virtualized executable function within an virtualized application runtime environment managed by a hypervisor, where the one or more executable instances can be executed on one or more physical machines according to the definitions, attributes, etc. stored in the data structure. Hence, an active container can be considered a Turing machine executing the operations defined in the corresponding data structure.

A container also inherits any and all hierarchal attributes associated with the particular executable function that it defines. Hence, as illustrated in FIGS. 2 and 3, a first container (e.g., 58a) can be "within" a second container (e.g., a first container inserted "within" the second container) (e.g., 60b) if the first container has a lower hierarchal order (i.e., lower hierarchal "layer") than the second container in an execution hierarchy, and the second container has a reference to the first container for execution of a prescribed virtualized operation associated with the at least a portion of a service provided by the second container. In other words, the first container can define at least one first executable operation required for execution of a second executable operation by the second container in the execution hierarchy. A first container can be considered as "within" a second container if both the first container and the second container share a common "domain" (e.g., administrative control, execution within the same physical machine, line card, rack, switching domain, data center, etc.) within a prescribed hierarchy; the first container also can be considered as "outside" and "below" the second container if the first container and the second container do not share the common "domain". As apparent from the description and accompanying drawings, the relationship between the first container and second container can vary depending on the type of hierarchy under analysis.

A fundamental problem associated with prior virtualizing of network functions is that the associated containers became "stateless" elements without knowledge of other virtualized network functions associated with a virtualized network service. In particular, a virtualized network function was considered "stateless" because it would only respond to a received request, where the request typically was from a container in a higher "level" of the hierarchy in a "North- South" computing system topology. In other words, a higher level container would contain a pointer for reachability to send a request to a lower-level container to perform a prescribed lower-level virtualized computing operation, and the request would contain sufficient information (e.g., IP address) to enable the lower-level container to send a response to the higher-level container. However, the lower-level container would have no knowledge of the higher-level container outside of the request initiated by the higher-level container, rendering the lower-level container incapable of initiating communications with the higher-level container.

Moreover, operations across multiple virtualized lower-level containers required a higher-level container to coordinate the sequence of requests and responses among each of the lower-level containers, such that lower-level containers were unaware of each other. Further, orchestrators to date were only involved with the creation of service by assigning lower-level containers (providing respective virtualized network functions) to a higher-level container providing the virtualized network service, with no consideration of the need for coordinated monitoring of the performance and needs for changes in capacity in the lower-level containers. Hence, any need for increasing capacity for a first virtualized network function associated with a virtualized network service was performed without regard to the need for a coordinated increase of capacity for other virtualized network functions associated with the same virtualized network service. Such uncoordinated increases in capacity could arise if different virtualized network services require different types of capacity increase (e.g., increase in bandwidth increase vs. increase in computer power capacity vs. increase in data storage capacity).

Figure 4:
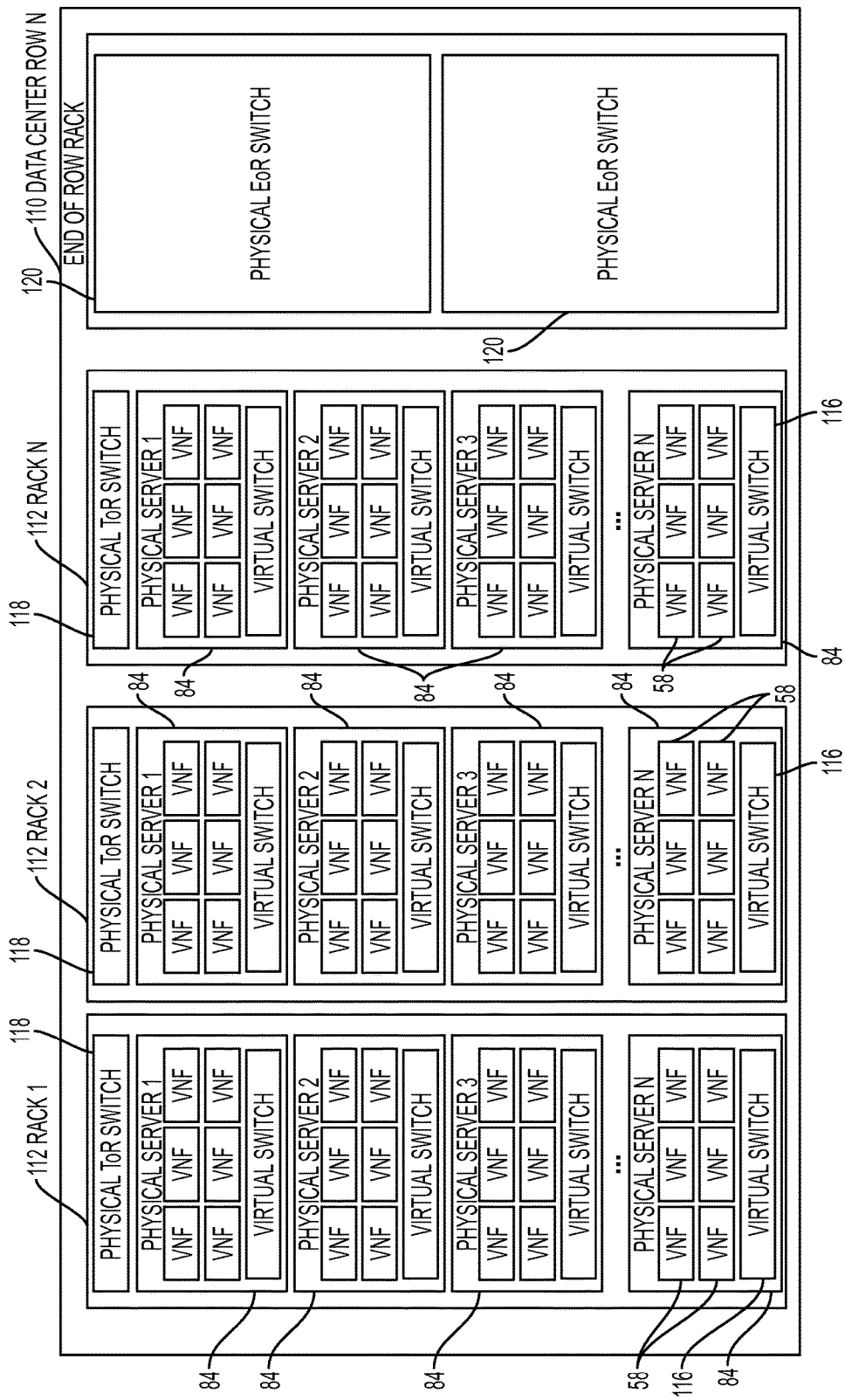
FIG. 4 illustrates an example implementation of a single row of a physical data center that can implement the example embodiments.

FIG. 4 illustrates an example implementation of a single row 110 of a physical data center having multiple physical rows 110 and that can implement the example embodiments. The following description of a data center that can implement virtualized network functions and virtualized network services according to example embodiments can help illustrate the complexity of allocating virtualized network functions for a virtualized network service, and the benefit of identifying interdependence among virtualized network functions (or attributes thereof).

Data center rooms typically are organized in multiple rows 110, with multiple physical racks 112 per row 110. Each physical rack 112 typically contains multiple physical servers 84, each representing physical resources upon which the orchestrator 12 can place (i.e., allocate, assign, etc.) a VNF (e.g., 58). Each server 84 also has a virtual switch (Vswitch) 116 configured for providing localized connections to (and between) the VNFs that reside on the physical server 84. Each rack 112 can include (e.g., at the top of the rack) a physical "Top of Rack" (ToR) switch 118, which provides the rack-level connectivity to (and between) the VNFs 58 that reside on different physical servers 84 within the corresponding rack 112. A multitude of racks 112 together comprise a row 110. Each row 110 in a data center can include at least one physical End of Row (EoR) switch 120, which provides aggregation of all ToR switches 118 and provides row-level connectivity for VNFs 58 that reside within the row on different racks 112.

The physical resources (e.g., compute, memory, and/or network) that are consumed to provide a virtualized network service are based on the placement of the associated VNFs 58 within the data center; in other words, more network resources are required to provide a virtualized network service if the interdependent VNFs are placed within physical servers 84 that are further apart topologically within a data center, Ideally, all VNFs 58 for a particular virtualized service would reside on the same physical server 84, such that the communication flows between the VNFs 58 of the same service would be limited to only involve the Vswitch 116 in the same physical server 84; however, placement of all VNFs 58 associated with a particular virtualized service within a single physical server 84 may not always be possible due to limited resources within the single physical server 84.

The next ideal scenario is for all VNFs 58 associated with a particular service to reside on the same physical rack (e.g., "Rack 2") 112, which limits communication flow between VNFs 58 of the same virtual service to involve the corresponding ToR switch 118 for that rack (e.g., "Rack 2") 112, and the number N×V switches 116 associated with the servers 84 for the N VNFs 58. However, because there are limited resources within a single rack 112, allocating all VNFs 58 within a single rack 112 may not always be possible.

A less ideal scenario is when VNFs 58 associated with a particular virtualized service reside on different racks (e.g., "Rack 1" and "Rack N") 112 within the same row 110. The communication flow between the VNFs 58 for the same virtual service now involve the EoR switch 120 for that row 110, M×ToR 118 switches (one for each rack 112 containing an associated VNF 58) and N×V switches 116 associated with the servers 84 for the N VNF 58. However, because there are limited resources within a single row 110, this allocation within a single row 110 may not always be possible.

An even less ideal scenario is when VNFs 58 associated with a particular virtualized network service reside on different rows 110 within the same data center. The communication flow between the VNFs associated with the same virtual service now involve L×EoR switches 120 (one for each row 110 containing an associated VNF 58), M×ToR switches 118 (one for each rack 112 containing an associated VNF 58), and N×V switches 116 associated with the physical servers 84 for the N VNFs 58.

The orchestrator 12 is responsible for limiting the number of physical resources involved in the implementation of the virtual service, and ensure that interdependent VNFs 58 are located in such a way to minimize implications to ToR switches 112 and EoR switches 120 (i.e., minimize the use of the ToR switches 112 and/or EoR switches 120 for execution of a given virtualized network service). In the case of a distributed architecture that utilizes multiple physical data centers connected by wide area network (WAN) circuits, the management by the orchestrator becomes even more complex.

According to example embodiments, the orchestrator executed by a physical machine (14 of FIG. 5) not only can allocate virtualized network functions for creation of a virtualized network service, but the orchestrator also can identify each of the virtualized network functions as interdependent for coordinated execution of the virtualized network service, based on setting by the orchestrator an interdependency indicator within each virtualized container associated with providing a corresponding virtualized network function for the virtualized network service. The interdependency indicator can create a "stateful" condition in the virtualized container, enabling the virtualized container to utilize the interdependency indicator as a "pointer" toward a virtualized management entity associated with the virtualized network service.

The virtualized management entity, executed for example as part of the orchestrator (e.g., the service reporting module

80 of FIG. 3), can receive information associated the performance of the virtualized container within the context of the virtualized network service; hence, the orchestrator 12 can monitor the performance of each virtualized network function within the context of the virtualized network service, and execute coordinated changes among the virtualized network functions associated with the virtualized network service. Hence any capacity changes required by a given virtualized network function can be coordinated among the interdependent virtualized network functions by the virtualized management entity.

In another embodiment, a network orchestration function, can be aware of the type of network function being virtualized, and can establish requests to a Cloud Orchestrator at a different hierarchal level. The Network Orchestration Function can assign unique Virtual Machines to well-understood network functions. A cloud orchestration layer, which resides above the Network Orchestration Function, can remain unaware of the nature of the Virtual Network Function, and only need be interested in the set of requirements for the Virtual Network Function. In another embodiment, the network orchestration function and cloud orchestration function can be "collapsed" into a single orchestration function.

In a mobile environment, this interdependence can be seen between such virtualized nodes as a MME 58*b*, SGW 58*c*, PGW 58*e*, a Home Subscriber Server (HSS) (not shown), and a Policy and Rules Charging Function (PCRF) (not shown), all of which scale multidimensionally based on subscribers, sessions, and control-plane events. In the case of bearer nodes, such as SGW and PGW, scale is also based on features and throughput.

Hence, particular embodiments can identify within a virtual container the interdependence of specific software elements. In the case of Network Function Virtualization, being defined by the European Telecommunications Standards Institute (ETSI), the example embodiments can define interdependent Virtualized Network Functions and allow the management system to determine the appropriate interdependent scaling attributes between these virtualized network functions.

Figure 5:
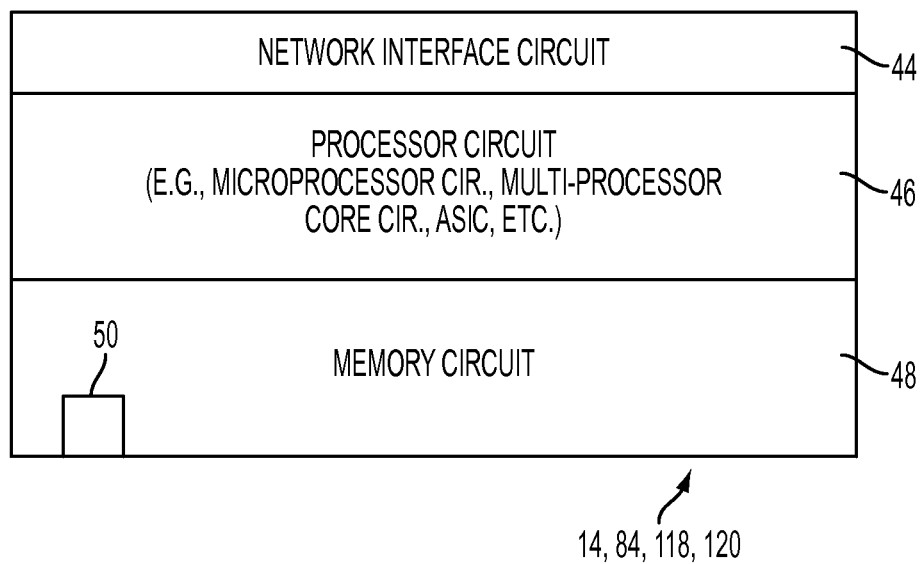
FIG. 5 illustrates an example apparatus for executing any one of the orchestrator or virtualized network services, according to an example embodiment.

FIG. 5 illustrates an example implementation of a machine 14 configured for executing any one of the disclosed virtual elements, including the orchestrator 12. FIG. 5 also illustrates any one of the physical devices 84, 86 of FIG. 3 or 4, and/or 118, and/or 120 of FIG. 4. The apparatus 14, 28, 84, 118, and/or 120 can include a network interface circuit 44, a one or more processor circuits 46, and a memory circuit 48. The network interface circuit 44 can include one or more distinct physical layer transceivers for communication with any one of other devices 84, 86, and/or 88 of FIG. 3; the network interface circuit 44 also can include an IEEE based Ethernet transceiver for communications with the devices of FIG. 3 via a wired Ethernet link, and/or a fiber optic transceiver, etc. The processor circuit 46 can be configured for executing any of the operations described herein, and the memory circuit 48 can be configured for storing any data as described herein.

Any of the disclosed circuits of the apparatus 14, 28, 84, 118, and/or 120 (including the network interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 6A:
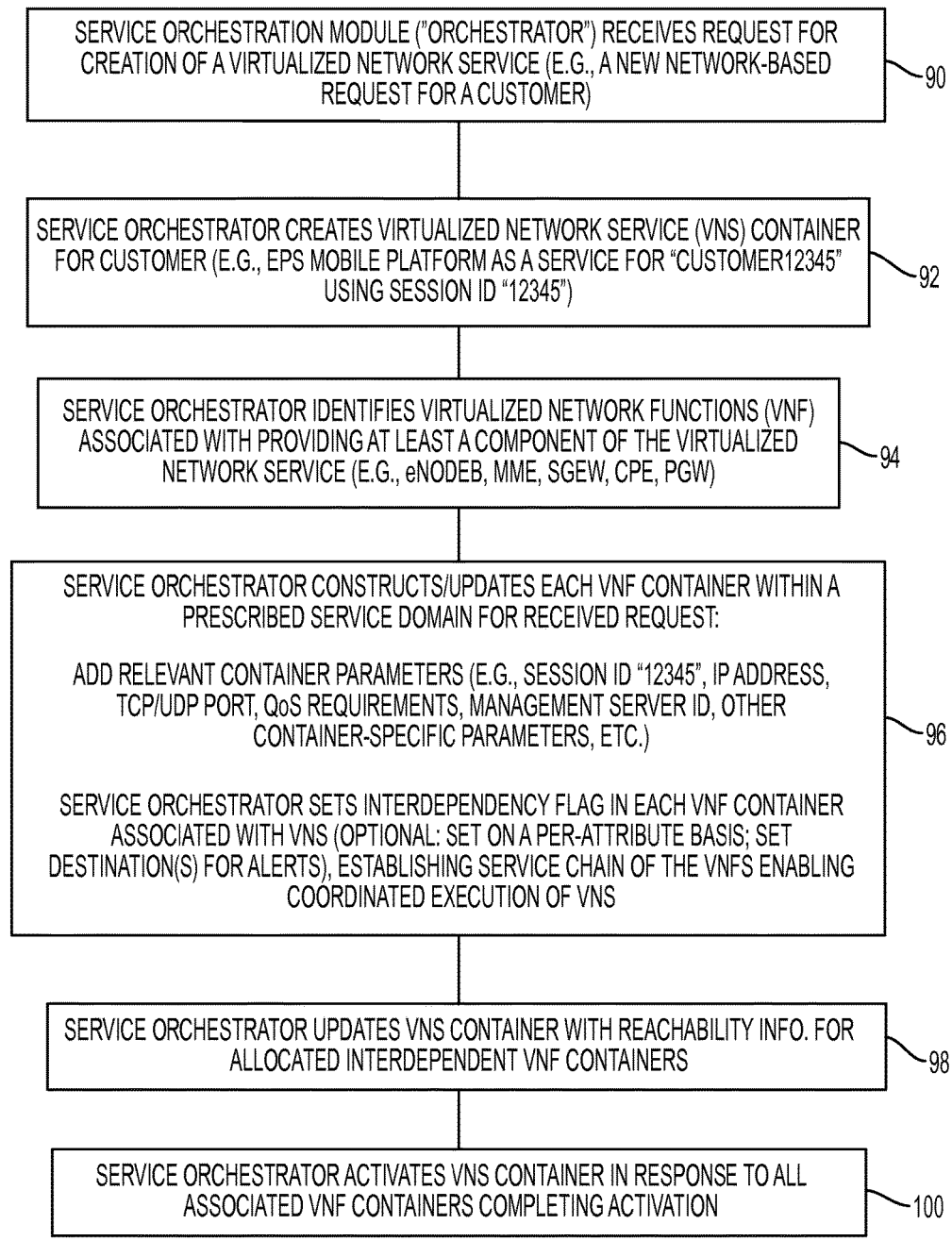
FIGS. 6A and 6B illustrate an example method by the orchestrator of defining interdependent virtualized network functions for service level orchestration of a virtualized network service for a customer, according to an example embodiment.
Figure 6B:
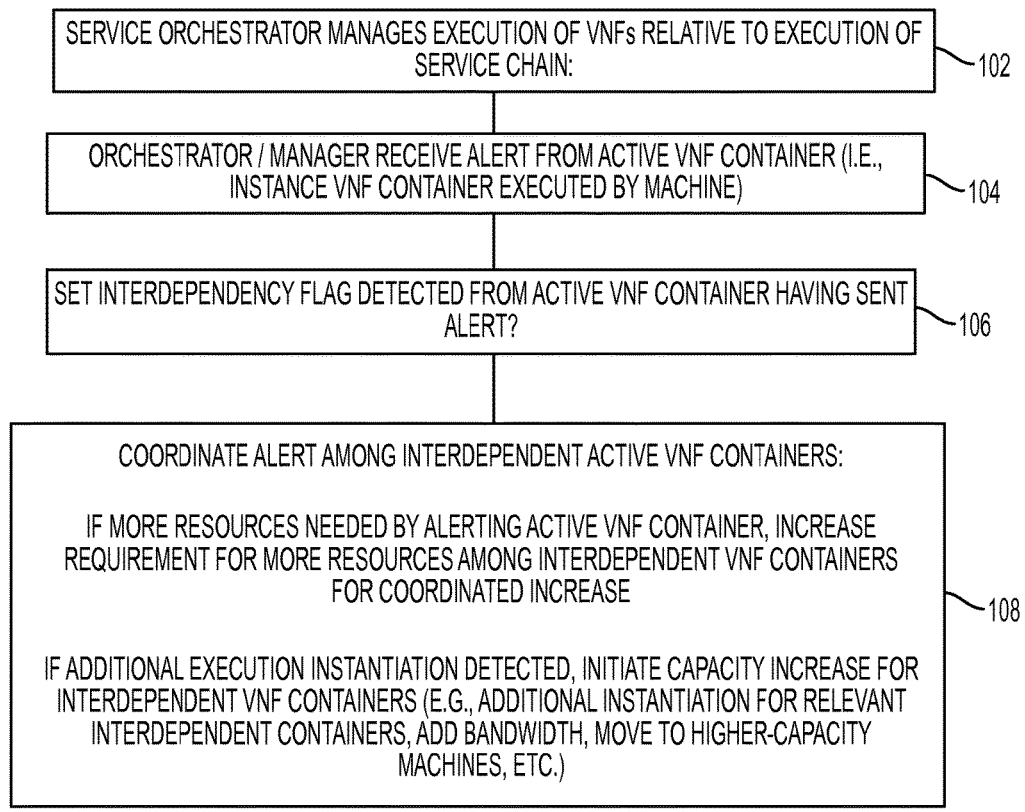

FIGS. 6A and 6B illustrate an example method by the orchestrator of defining interdependent virtualized network functions for service level orchestration of a virtualized network service for a customer, according to an example embodiment. The operations described with respect to any of the Figures can be implemented as executable code stored on a computer or physical machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the physical machine-based hardware components as described herein; to the contrary, other physical machine-based hardware components can be used to execute the disclosed operations in any appropriate order, or at least some of the operations in parallel.

The service orchestration module (i.e., the network orchestrator) 12 in operation 90 can receive a request for creation for a virtualized network service 54, for example a new network request in the form of a container 16 from a customer portal 18 (FIG. 1). The service level orchestrator 12 in operation 92 can create a virtualized network service (VNS) container for the customer, including for example a customer number, session identifier, etc. The service level orchestrator 12 also can identify in operation 94 any virtualized network functions (VNFs) from the VNF domain 60 that are required for implementation of the virtualized network service. As part of the provisioning operation, the service level orchestrator 12 in operation 96 can construct and/or update each VNF container for any required VNFs from the VNF domain 60 with any necessary parameters or requirements.

The network orchestrator 12, as part of service creation, can specify in operation 96 any one or more of the following requirements in a container for a virtualized operation: Compute Resources; Storage Resources and Type (IMDB, SAN, Disk, SSD); Memory Resources (RAM) (in the case of IMDB, memory resources may be tied to storage); L2/L3 Virtual Interface (Bandwidth, number of VLAN identifiers, number of IP Address Pool, throughput); I/O Resources (Bandwidth to storage, to management plane, to bearer plane, etc.); QoS (MBR, GBR, Latency, jitter, etc.); physical, network, and/or virtual location information; Load-balancing request (across multiple VMs); Elasticity Requests or requirements for auto-scaling. The network orchestrator 12 also can add session IDs, IP addresses, TCP/UDP ports, QoS Requirements, manager server ID (e.g., to send notification messages regarding management flags, SNMP traps, capacity alarms, etc.), as well as other container-specific parameters.

The network orchestrator 12 also in operation 96 can set an interdependency indicator in each VNF container associated with the virtualized network service 54: if necessary, the interdependency indicator can be set on a per-attribute basis, especially if different alerts require additional capacity of different types or dimensions (e.g., move to larger machine to increase compute or storage, increase bandwidth or QoS, etc.). In other words, the network orchestrator 12 can set a first interdependency indicator for "direct interdependence" between attributes of the same or similar types, for example where the first interdependency indicator can indicate that scaling a bandwidth on VNF1 (e.g., 58d) affects scaling bandwidth on VNF2 (e.g., 58e); the network orchestrator 12 also can set a second interdependency indicator for "indirect interdependence" between attributes of different types, for example the second interdependency indicator set for a first attribute of a first attribute type (e.g., network bandwidth) in a first VNF container 58b can identify an interdependence with a corresponding set second interdependency indicator for a second attribute of a second attribute type (e.g., storage/memory requirement) in a second VNF container 57c. Each interdependency indicator can be implemented in various forms, for example a simple "bit" flag, a bit mask, and/or a unique value that uniquely defines the interdependency indicator within the virtualized network service 54, etc. Other protocol-specific indicators can be used to ensure the orchestrator 12 is aware of the interdependency between virtualized network functions. Hence, virtualized network functions can be identified as interdependent based on their respective containers having the same interdependency indicator (e.g., same bit flag, same corresponding bit within a bit mask, same indicator value, etc.).

Interdependency between virtualized network functions (and/or between attributes of different VNFs) can be known by the network orchestrator 12 before the creation of the virtualized network service 54, for example based on pre-scribed definitions of the virtualized network service 54, the VNFs 58, and/or any of the associated attributes. Interdependency between virtualized network functions (and/or between attributes of different VNFs) also can be determined (e.g., "learned") by the network orchestrator 12 during and/or after service creation based on the network orchestrator 12 monitoring the virtualized network service 54. Hence, the orchestrator in operation 96 can define a service chain 60 (e.g., in FIG. 7) of the VNFs 58 for coordinated execution of the virtualized network service.

The network orchestrator 12 in operation 98 can update the VNS container with the reachability information for the allocated interdependent VNF containers, enabling identification of the VNFs 58 associated with the specific VNS session 54. The orchestrator 12 in operation 100 can activate the VNS container for service in response to detecting all the associated VNF containers have completed activation.

Referring to FIG. 6B, the Network Orchestration Function 12 is enabled in operation 102 to understand (either through derived logic, such as analytics, or directly, through programming) the interdependence between particular virtual network functions, and manage execution of the VNFs relative to the execution of the service chain 60. In a mobile environment, for example, the Network Orchestration Function is enabled to understand the correlation of bandwidth between the SGW and PGW, or the correlation between memory resources between SGW, PGW, and MME, or further to understand the transaction scale correlation between the HSS and SPR.

For example, in operation 104 the orchestrator 12 (e.g., the service reporting module 80 of FIG. 3) can receive an alert from an active VNF container. If in operation 106 the application decision making module 70 detects the alert is from an active VNF container having an interdependency indicator, the application decision making module 70 can coordinate the alert in operation 108 among the interdependent active VNF containers (e.g., across all the applications 60a, 60b, 60c, and/or any of the elements 58, 66, 68, 69, 71, 72, etc.). For example, if more resources are needed, the requirement for more resources can be increased multidimensionally across all the interdependent VNF containers for a coordinated increase in capacity. For example, if additional instantiation is needed for a given VNF container, a corresponding increase of capacity is initiated across the interdependent containers.

Figure 7:
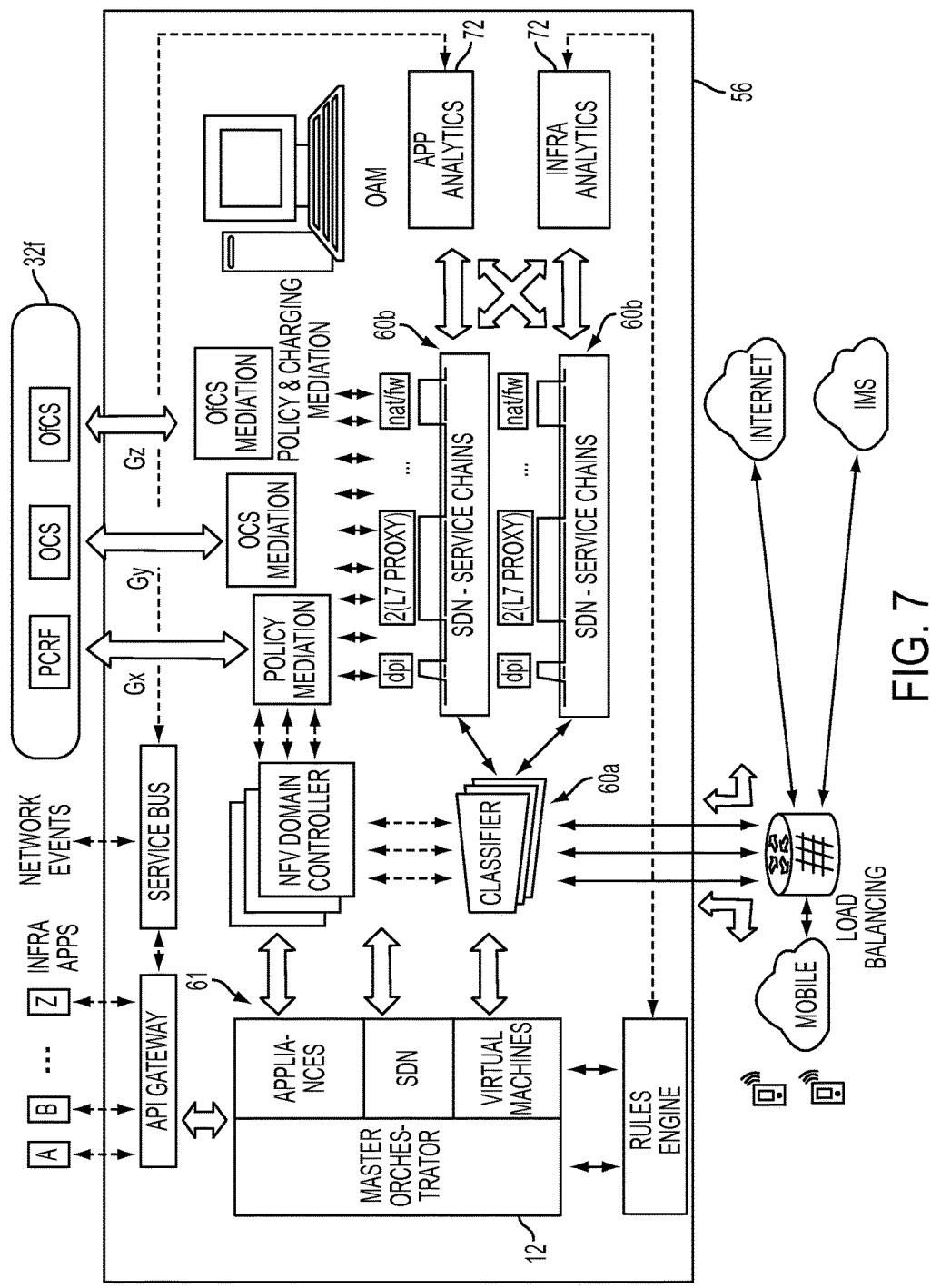
FIG. 7 illustrates an example architecture of virtualized IP services in a telecommunications network based on the orchestrator of FIG. 1 defining interdependent virtualized network functions, according to an example embodiment.

Hence, the orchestration module can provide a coordinated increase of all virtualized network functions associated with a collection of different virtualized network services, even if the virtualized network functions associated with a virtualized service chain 60 need to be moved to new hardware devices. As illustrated in FIG. 7, the numerous virtualized functions associated with the virtualized IP services 56 can have increased capacity in a coordinated manner, including the classification functions 60a, service chains 60b providing various operations (e.g. YouTube streaming, etc.) using coordinated virtualized operations such as deep packet inspection (dpi), layer 2-7 proxy operations, and Network Address Translation/Firewall (nat/fw) operations. Other operations associated with the IP services 56, including analytics 72 that are identified as interdependent with the operations 60, etc. also are provided coordinated execution of management operations.

According to example embodiments, coordinated scaling of virtualized network functions ensures an entire virtualized network service can be scaled as needed. Different modifications and variations can be employed, described below.

In another embodiment, the Virtual Network Function when distributed over multiple VM can make use of an application level load balancing that shall take account of many of the KPI as stated above to make full and effective use of the available resources yet shall not be responsible for establishing additional Virtual Machine entities.

The Network Orchestration Function is operable to support this interdependency indicator on a per-attribute basis, and alert the Cloud Orchestrator when there are dependencies between particular Network Functions contained within Virtual Machines.

The Cloud Orchestrator is operable to notify the Network Orchestration Function of the assignment of particular Virtual Machine identifiers to particular requests such that the Network Orchestration Function can map virtual topologies.

When the Network Orchestration Function makes a request to the Cloud Orchestrator for the establishment or modification of a particular Virtual Machine, specific dependencies are identified (with the Interdependency Indicator identifying the attribute, and which other VMs the dependency exists with), such that appropriate actions can be taken.

In the case of VM establishment, the Cloud Orchestrator monitors KPI thresholds, rate of change of application protocol level messaging, overload and error indicator codes, operator policy and may compare the requested resource assignment with that of interdependent Network Function and make determination as to whether the request should be accepted, whether the request triggers modification of existing virtual machines, or whether the request should be rejected.

VM establishment requests which contain a load-balancing or auto-scale request require an additional orchestration event—in which the Cloud Orchestrator determines whether the stepwise increased capacity (load-balancing) or the dynamic capacity scale is one that the interdependent Virtual Machines are able to support. For instance, a load-balancing request may trigger the establishment of a new interdependent virtual machine and a similar load-balancing model to be established. An Auto-scale request may trigger the modification of existing interdependent Virtual Machines to also be auto-scale enabled. Such decision criteria are left to the logic inherent in the Cloud Orchestrator; however, the example embodiments seek to provide the interdependency information for decision logic to be implemented.

In the case of VM modification, the Cloud Orchestrator may determine whether other VMs should be scaled down to free stranded capacity or scaled up to support additional capacity.

In the case of VM deletion, the Cloud Orchestrator may determine whether other VMs should be scaled down or deleted to free stranded capacity.

In one embodiment, the Network Orchestration Function is combined (i.e., collapsed) with the Cloud Orchestration Function, allowing the Cloud Orchestration Function to be aware of, and track state of, interdependent network functions.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   identifying, by an orchestrator executed by a physical machine, a plurality of virtualized network functions required for implementation of a virtualized network service for a customer, each virtualized network function having a corresponding and distinct virtualized container specifying attributes for defining execution of the corresponding virtualized network function within one or more physical machines; and
   setting by the orchestrator an interdependency indicator within each virtualized container based on association with the virtualized network service, the setting of the interdependency indicator enabling identification of each of the virtualized network functions as interdependent and causing coordinated execution, of each of the virtualized network functions associated with the virtualized network service, across different virtualization domains having respective different administrative controls and the different virtualization domains executed on different physical machines, and causing the implementation of the virtualized network service among the different physical machines.

2. The method of claim 1, wherein the setting includes selectively setting the interdependency indicator in said each virtualized container on a per-attribute basis, enabling identification that a prescribed attribute for execution of a first of the virtualized network functions is interdependent on the corresponding prescribed attribute for execution of a second of the virtualized network functions.

3. The method of claim 2, wherein the attributes in any one virtualized container includes an identification of any one of available hardware resource capacity in the one or more physical machines, hardware requirements for the corresponding virtualized network function, location information for the customer, location information for the one or more physical machines, Quality of Service (QoS) requirements for the corresponding virtualized network function, or an elasticity requirement identifying one or more auto-scaling requirements for the corresponding virtualized network function.

4. The method of claim 1, further comprising:
   detecting a requirement for more resources for one of the virtualized network functions; and
   increasing the requirement for more resources in the other virtualized network functions, based on the interdependency indicator in the corresponding virtualized container of the one virtualized network function and in the respective virtualized containers of the other virtualized network functions, enabling coordinated increase for more resources among the interdependent virtualized network functions.

5. The method of claim 1, further comprising:
   detecting an additional execution instantiation of one of the virtualized network functions; and
   initiating a corresponding additional execution instantiation for each of the other virtualized network functions, based on the interdependency indicator in the corresponding virtualized container of the one virtualized network function and in the respective virtualized containers of the other virtualized network functions, enabling coordinated increase of execution instantiations among the interdependent virtualized network functions.

6. The method of claim 1, further comprising the orchestrator creating a service chain of the virtualized network functions for the virtualized network service based on the interdependency indicator in each of the virtualized containers.

7. The method of claim 6, further comprising the orchestrator managing the execution of any one of the virtualized network functions relative to execution of the service chain.

8. An apparatus implemented as a physical machine, the apparatus comprising:
    non-transitory machine readable media configured for storing executable machine readable code; and
    a processor circuit configured for executing the machine readable code, and when executing the machine readable code operable for:
    identifying, by an orchestrator, a plurality of virtualized network functions required for implementation of a virtualized network service for a customer, each virtualized network function having a corresponding and distinct virtualized container specifying attributes for defining execution of the corresponding virtualized network function within one or more physical machines, and
    setting by the orchestrator an interdependency indicator within each virtualized container based on association with the virtualized network service, the setting of the interdependency indicator enabling identification of each of the virtualized network functions as interdependent and causing coordinated execution, of each of the virtualized network functions associated with the virtualized network service, across different virtualization domains having respective different administrative controls and the different virtualization domains executed on different physical machines, and causing the implementation of the virtualized network service among the different physical machines.

9. The apparatus of claim 8, wherein the setting includes selectively setting the interdependency indicator in said each virtualized container on a per-attribute basis, enabling identification that a prescribed attribute for execution of a first of the virtualized network functions is interdependent on the corresponding prescribed attribute for execution of a second of the virtualized network functions.

10. The apparatus of claim 9, wherein the attributes in any one virtualized container includes an identification of any one of available hardware resource capacity in the one or more physical machines, hardware requirements for the corresponding virtualized network function, location information for the customer, location information for the one or more physical machines, Quality of Service (QoS) requirements for the corresponding virtualized network function, or an elasticity requirement identifying one or more autoscaling requirements for the corresponding virtualized network function.

11. The apparatus of claim 8, further operable for:
    detecting a requirement for more resources for one of the virtualized network functions; and
    increasing the requirement for more resources in the other virtualized network functions, based on the interdependency indicator in the corresponding virtualized container of the one virtualized network function and in the respective virtualized containers of the other virtualized network functions, enabling coordinated increase for more resources among the interdependent virtualized network functions.

12. The apparatus of claim 8, further operable for:
    detecting an additional execution instantiation of one of the virtualized network functions; and
    initiating a corresponding additional execution instantiation for each of the other virtualized network functions, based on the interdependency indicator in the corresponding virtualized container of the one virtualized network function and in the respective virtualized containers of the other virtualized network functions, enabling coordinated increase of execution instantiations among the interdependent virtualized network functions.

13. The apparatus of claim 8, further operable for the orchestrator creating a service chain of the virtualized network functions for the virtualized network service based on the interdependency indicator in each of the virtualized containers.

14. The apparatus of claim 13, further operable for the orchestrator managing the execution of any one of the virtualized network functions relative to execution of the service chain.

15. Logic encoded in one or more non-transitory tangible media for execution by a physical machine and when executed by the physical machine operable for:
    identifying, by an orchestrator executed by the physical machine, a plurality of virtualized network functions required for implementation of a virtualized network service for a customer, each virtualized network function having a corresponding and distinct virtualized container specifying attributes for defining execution of the corresponding virtualized network function within one or more physical machines; and
    setting by the orchestrator an interdependency indicator within each virtualized container based on association with the virtualized network service, the setting of the interdependency indicator enabling identification of each of the virtualized network functions as interdependent and causing coordinated execution, of each of the virtualized network functions associated with the virtualized network service, across different virtualization domains having respective different administrative controls and the different virtualization domains executed on different physical machines, and causing the implementation of the virtualized network service among the different physical machines.

16. The logic of claim 15, wherein the setting includes selectively setting the interdependency indicator in said each virtualized container on a per-attribute basis, enabling identification that a prescribed attribute for execution of a first of the virtualized network functions is interdependent on the corresponding prescribed attribute for execution of a second of the virtualized network functions.

17. The logic of claim 16, wherein the attributes in any one virtualized container includes an identification of any one of available hardware resource capacity in the one or more physical machines, hardware requirements for the corresponding virtualized network function, location information for the customer, location information for the one or more physical machines, Quality of Service (QoS) requirements for the corresponding virtualized network function, or an elasticity requirement identifying one or more autoscaling requirements for the corresponding virtualized network function.

18. The logic of claim 15, further operable for:
- detecting a requirement for more resources for one of the virtualized network functions; and
- increasing the requirement for more resources in the other virtualized network functions, based on the interdependency indicator in the corresponding virtualized container of the one virtualized network function and in the respective virtualized containers of the other virtualized network functions, enabling coordinated increase for more resources among the interdependent virtualized network functions.

19. The logic of claim 15, further operable for:
- detecting an additional execution instantiation of one of the virtualized network functions; and
- initiating a corresponding additional execution instantiation for each of the other virtualized network functions, based on the interdependency indicator in the corresponding virtualized container of the one virtualized network function and in the respective virtualized containers of the other virtualized network functions, enabling coordinated increase of execution instantiations among the interdependent virtualized network functions.

20. The logic of claim 15, further operable for the orchestrator creating a service chain of the virtualized network functions for the virtualized network service based on the interdependency indicator in each of the virtualized containers.

\* \* \* \* \*